(12) United States Patent
Kanamura et al.

(10) Patent No.: US 9,260,320 B2
(45) Date of Patent: *Feb. 16, 2016

(54) CERAMIC MATERIAL AND USE THEREOF

(75) Inventors: Kiyoshi Kanamura, Hachioji (JP); Atsushi Kaeriyama, Minamiashigara (JP); Toshihiro Yoshida, Nagoya (JP); Akihiko Honda, Aichi-ken (JP); Yosuke Sato, Gifu-ken (JP)

(73) Assignees: NGK Insulators, Ltd., Nagoya (JP); Tokyo Metropolitan University, Shinjuku (JP)

( * ) Notice: Subject to any disclaimer, the term of this patent is extended or adjusted under 35 U.S.C. 154(b) by 137 days.

This patent is subject to a terminal disclaimer.

(21) Appl. No.: 12/873,400

(22) Filed: Sep. 1, 2010

(65) Prior Publication Data
US 2011/0053000 A1   Mar. 3, 2011

(30) Foreign Application Priority Data

Sep. 3, 2009  (JP) ................................. 2009-203898
Aug. 31, 2010 (JP) ................................. 2010-194671

(51) Int. Cl.
| C04B 35/48 | (2006.01) |
| C04B 35/64 | (2006.01) |
| C04B 35/50 | (2006.01) |
| C04B 35/01 | (2006.01) |
| C01D 15/02 | (2006.01) |
| C01G 25/00 | (2006.01) |
| C04B 35/486 | (2006.01) |
| H01M 6/18 | (2006.01) |
| H01M 10/0562 | (2010.01) |

(52) U.S. Cl.
CPC ............. *C01G 25/006* (2013.01); *C01D 15/02* (2013.01); *C04B 35/486* (2013.01); *H01M 6/185* (2013.01); *H01M 10/0562* (2013.01); *C01P 2002/50* (2013.01); *C01P 2002/72* (2013.01); *C01P 2006/10* (2013.01); *C01P 2006/40* (2013.01); *C04B 2235/322* (2013.01); *C04B 2235/3203* (2013.01); *C04B 2235/3227* (2013.01); *C04B 2235/658* (2013.01); *C04B 2235/6583* (2013.01); *C04B 2235/764* (2013.01); *C04B 2235/77* (2013.01); *Y02E 60/122* (2013.01)

(58) Field of Classification Search
CPC combination set(s) only.
See application file for complete search history.

(56) References Cited

U.S. PATENT DOCUMENTS 8,841,033 B2 *  9/2014  Yamamura et al. ........... 429/322
8,883,357 B2 * 11/2014  Yoshida et al. ............... 429/322

(Continued)

FOREIGN PATENT DOCUMENTS

CA    2 694 259     1/2009
CN    101014540    8/2007

(Continued)

OTHER PUBLICATIONS

Thangadurai, Novel Fast Lithium Ion Conduction in Garnet-Type Li5La3M2O12 (M=Nb, Ta), 437-440 J. Am. Cer. Soc. 86.3 (2003).*

(Continued)

*Primary Examiner* — Yoshitoshi Takeuchi
(74) *Attorney, Agent, or Firm* — Burr & Brown, PLLC

(57) ABSTRACT

The present invention provides a ceramic material allowing a pellet having higher density and satisfactory Li ion conduction to be obtained. The ceramic material contains Li, La, Zr, Al and O and has a garnet-type or garnet-like crystal structure, the ratio of the number of moles of Li with respect to La being 2.0 or greater to 2.5 or lower.

14 Claims, 3 Drawing Sheets

(56) References Cited

U.S. PATENT DOCUMENTS

| | | | |
|---|---|---|---|
| 2005/0252853 A1 | 11/2005 | Berland et al. | |
| 2007/0148553 A1* | 6/2007 | Weppner | 429/322 |
| 2008/0265718 A1 | 10/2008 | Sakashita et al. | |
| 2009/0311605 A1 | 12/2009 | Visco et al. | |
| 2010/0047063 A1 | 2/2010 | Kulkarni et al. | |
| 2010/0047696 A1 | 2/2010 | Yoshida et al. | |
| 2010/0203383 A1 | 8/2010 | Weppner | |
| 2011/0053002 A1 | 3/2011 | Yamamura et al. | |
| 2011/0133136 A1 | 6/2011 | Weppner et al. | |
| 2011/0244337 A1 | 10/2011 | Ohta et al. | |

FOREIGN PATENT DOCUMENTS

| | | |
|---|---|---|
| CN | 101239824 | 8/2008 |
| CN | 101295762 | 10/2008 |
| CN | 101454477 | 6/2009 |
| CN | 102308425 A | 1/2012 |
| EP | 2 037 527 A1 | 3/2009 |
| EP | 2 159 867 A1 | 3/2010 |
| JP | H02-250264 | 10/1990 |
| JP | H11-001323 | 1/1999 |
| JP | 2005-166685 | 6/2005 |
| JP | 2007-528108 | 10/2007 |
| JP | 2008-112724 | 5/2008 |
| JP | 2010-045019 | 2/2010 |
| JP | 2010-176941 | 8/2010 |
| JP | 2010-202499 | 9/2010 |
| JP | 2010-534383 | 11/2010 |
| JP | 2010-272344 | 12/2010 |
| JP | 2011-051800 | 3/2011 |
| JP | 2011-051855 | 3/2011 |
| JP | 2011-073962 | 4/2011 |
| WO | 2005/085138 | 9/2005 |
| WO | 2009/003695 | 1/2009 |
| WO | 2010/090301 A1 | 8/2010 |

OTHER PUBLICATIONS

U.S. Appl. No. 12/873,393, filed Sep. 1, 2010, Yamamura et al.

Venkataraman Thangadurai, et al., "*Novel Fast Lithium Ion Conduction in Garnet-Type $Li_5La_3M_2O_{12}$ ($M=Nb, Ta$),*" Journal of American Ceramic Society, vol. 86, No. 3, Jan. 1, 2003, pp. 437-440.

Venkataraman Thangadurai, et al., "*Effect of Sintering on the Ionic Conductivity of Garnet-Related Structure $Li_5La_3Nb_2O_{12}$ and In- and K-doped $Li_5La_3Nb_2O_{12}$,*" Journal of Solid State Chemistry, vol. 179, No. 4, Apr. 1, 2006, pp. 974-984.

Murugan, Ramaswamy, et al. "*Fast Lithium Ion Conduction in Garnet-Type $Li_7La_3Zr_2O_{12}$,*" Angew. Chem. Int. Ed. 2007, 46, pp. 7778-7781.

U.S. Office Action, U.S. Appl. No. 12/873,393, dated Sep. 19, 2012 (15 pages).

Chinese Office Action, Chinese Application No. 201010277435.2, dated May 6, 2013 (8 pages).

Final Office Action, U.S. Appl. No. 12/873,393, dated Feb. 15, 2013 (10 pages).

Lu, Cheng-Zhang. "*Electrochemical performance of $LiCoO_2$ cathodes by surface modification using lanthanum aluminum garnet,*" Journal of Power Sources 184. May 13, 2008, pp. 392-401.

Chinese Office Action, Chinese Application No. 201010277435.2, dated Jun. 18, 2014 (6 pages).

Japanese Office Action, (with English Translation) Japanese Patent Application No. 2010-194666, dated Apr. 30, 2013 (6 pages).

Japanese Office Action, (with English Translation) Japanese Patent Application No. 2010-194671, dated May 21, 2013 (4 pages).

Summons to Attend Oral Proceedings Pursuant to Rule 115(1) EPC, European Application No. 10175091.7, dated Dec. 19, 2014 (11 pages).

Letter from the Opponent (With English Translation), European Application No. 10175091.7, dated Apr. 13, 2015 (34 pages).

* cited by examiner

CERAMIC MATERIAL AND USE THEREOF

CROSS-REFERENCE TO RELATED APPLICATION(S)

This application claims priority to Japanese Patent Application No. 2009-203898 filed on Sep. 3, 2009 and Japanese Patent Application No. 2010-194671 filed on Aug. 31, 2010, the contents of which are hereby incorporated by reference into the present application.

BACKGROUND OF THE INVENTION

1. Field of the Invention

The present invention relates to a ceramic material and use thereof, and in particular, to a ceramic material usable for a secondary battery and use thereof.

JOINT RESEARCH AGREEMENT

The presently claimed invention was made by or on behalf of NGK Insulators, Ltd. and Tokyo Metropolitan University according to a Joint Research Agreement which was in effect on or before the date the claimed invention was made. The claimed invention was made as a result of the activities undertaken within the scope of the Joint Research Agreement within the meaning of 35 USC §103(c)(3).

2. Description of Related Art

In recent years, with the development of portable devices such as personal computers and mobile phones, there has been rapidly increasing demand for secondary batteries usable as a power source thereof. In cells of the secondary batteries used in such applications, a liquid electrolytes (an electrolytic solution) containing a combustible organic diluent solvent are commonly used as an ion transfer medium. In batteries using such electrolytic solution, there is the possibility that problems such as leaking of the electrolyte solution, ignition, explosion and the like may occur.

Thus, from the point of view of ensuring safety intrinsically, advances are being made in the development of all-solid-state secondary batteries, in which solid-state electrolytes are used in place of a liquid electrolytes, while at the same time, all battery elements are constituted by solids. Such all-solid-state secondary batteries have the advantages in that, there is no danger of ignition or leakage due to being ceramics sintered with electrolytes, and moreover, problems such as deterioration of the battery capability due to corrosion do no occur readily. Among these, all-solid-state lithium secondary batteries using lithium metals for the electrodes are believed to be secondary batteries that can easily be given a high energy density.

In addition, in order to improve the battery performance of a secondary battery, the keys thereof are the enlargement of the difference in electric potential between the materials used for the positive electrode and the negative electrode, and the improvement of the volume density of each material used in the positive and negative electrodes. In particular for negative electrode materials, it is known that using Li metals or Li alloys has an important contribution to improving the battery performance. However, Li metals in the negative electrode, sometimes causes the phenomenon of precipitation of dendrite which is a whisker like crystalline along with charge-discharge behavior, penetrates the separator and causes a short inside the battery at the worst. Therefore, Li metals could not be used for the negative electrode due to safety issues. In an all-solid-state battery in which the electrolyte portion is formed by a solid-state electrolyte, since deposits cannot penetrate the solid-state electrolyte, it is anticipated to be usable safely. However, since this Li metal has high reactivity and lowest electric potential, so a useable solid-state electrolyte comprising a ceramic material has not been discovered heretofore.

In recent years, it has been reported that $Li_7La_3Zr_2O_{12}$ (hereinafter referred to as LLZ), a ceramic material of the garnet-type, had excellent lithium resistance, and that there was a possibility of being usable as a solid-state electrolyte for an all-solid-state Li secondary battery (see Ramaswamy Murugan et al., Angew. Chem. Int. Ed. 2007, 46, 1-5).

SUMMARY OF THE INVENTION

However, the ceramic material having a garnet-type crystal structure of LLZ described in Ramaswamy Murugan et al. is difficult to pelletize, and does not qualify as a solid-state electrolyte material that can be used practically for substituting an electrolyte in liquid form or the like. Consequently, the present inventors succeeded in pelletizing by including aluminum (Al) in ceramics having a LLZ crystal structure. However, additional compactization and decrease in resistance were necessary regarding this ceramic material as well.

In addition, the solid-state electrolyte material is thought to be useful for application in various secondary batteries such as air secondary batteries and LiS batteries, in addition to applications in lithium secondary batteries using electrolytes in liquid form.

Thus, an object of the description herein is to provide a use for a ceramic material allowing a pellet having higher density and satisfactory Li ion conduction to be obtained.

The present inventors have variously examined LLZ-Al based ceramics for the amount of Li in the materials and obtained the finding that density and Li ion conductivity were altered by the Li amount, and that satisfactory density and Li ion conductivity could be obtained by suitably adjusting the Li amount. According to the present invention, the following means are provided.

According to the description herein, a ceramic material is provided, containing Li, La, Zr, Al and O and having a garnet-type or garnet-like crystal structure, wherein the ratio of the number of moles of Li with respect to La is 2.0 or greater to 2.5 or lower.

The ceramic material may be one that can be obtained by firing raw materials in which Li and La are included with the ratio of the number of moles of Li with respect to La at above 2.1 to 2.6 or lower. In the ceramic material, La and Zr may be included in the raw material with the ratio of the number of moles of Zr with respect to La at 0.67. In addition, it is preferable that the ceramic material contains 0.1 percent by mass or more to 2 percent by mass or less Al with respect to the total mass. In addition, it is preferable that the ceramic material is a sintered body. In addition, it is preferable that the ceramic material has lithium ion conductivity. Further in addition, the ceramic material is preferable as a solid-state electrolyte material.

According to the description herein, a method for producing is provided, which is a method for producing a ceramic material comprising the step of synthesizing a ceramic material which contains Li, La, Zr, Al and O and has a garnet-type or garnet-like crystal structure, and in which the ratio of the number of moles of Li with respect to La is 2.0 or greater to 2.5 or lower.

The synthesis step may comprise the step of preparing and firing a raw material in which Li and La are included with the ratio of the number of moles of Li with respect to La at above 2.1 to 2.6 or lower. In addition, in the producing method, the raw material in which La and Zr are included with the ratio of the number of moles of Zr with respect to La at 0.67 may be prepared. In addition, the synthesis step may contain a first heat treatment step of acquiring a primary firing powder containing at least Li, La, Zr and O, and a second heat treatment step of obtaining the ceramic material by firing the primary firing powder in the presence of Al. In addition, the first heat treatment step may be a step of acquiring a primary firing powder comprising Li, La, Zr and O, and the second heat treatment step may be a step of firing an Al constituent and the primary firing powder. In addition, the second heat treatment step may be a step of firing and sintering a formed compact containing the primary firing powder. In addition, it is preferable that the producing method forms synthesis of the ceramic material in an inert gas atmosphere.

According to the description herein, a secondary battery is provided, which is an all-solid-state lithium secondary battery, provided with a positive electrode, a negative electrode and a solid-state electrolyte containing a ceramic material obtained by firing a raw material which contains Li, La, Zr, Al and O and has a garnet-type or garnet-like crystal structure, and in which Li and La are included with the ratio of the number of moles of Li with respect to La at above 2.1 to 2.6 or lower.

DETAILED DESCRIPTION OF THE INVENTION

Figure 1:
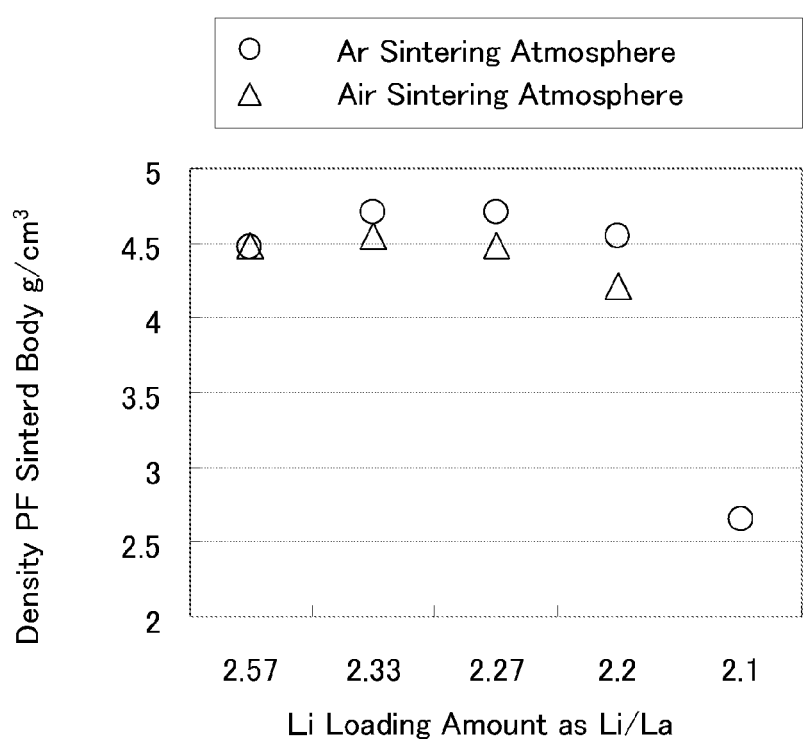
FIG. 1 shows the relationship between the Li loading amount and density in an Li—La—Zr—Al based ceramics.

The description herein relates to use of a ceramic material the ceramic material of the present invention is a material which contains Li, La, Zr, Al and O and has a garnet-type or garnet-like crystal structure, and in which the ratio of the number of moles of Li with respect to La is 2.0 or greater to 2.5 or lower. According to the description herein, sintered body which satisfactory sinterability (sintered body density) and Li ion conductivity are satisfactory may be obtained readily. Consequently, according to the description herein, a ceramic material can be obtained, having excellent resistance to lithium, and used as an electrolyte or a separator for various secondary batteries such as all-solid-state lithium secondary batteries.

In regard to the LLZ-Al based ceramic material described herein, although having a garnet-type or garnet-like crystal structure which LLZ possesses, as it contains Al, the suitable Li loading amount in order to obtain satisfactory density and Li ion conductivity was not necessarily clear. In addition, since Li volatilizes at firing time, the suitable Li loading amount was not clear. In such a situation, the present inventors determined for the first time a range of Li loading amounts that is suitable from the point of view of density and Li ion conductivity and succeeded in obtaining a ceramic material for which the density and Li ion conductivity were satisfactory.

In addition, according to the method for producing for a ceramic material described herein, a ceramic material for which the density and Li ion conductivity are satisfactory can be fabricated stably. Further in addition, according to the all-solid-state lithium secondary battery described herein, an all-solid-state lithium secondary battery is provided with an excellent resistance to lithium.

Hereafter, first, the ceramic material described herein (hereafter simply referred to a the present ceramic material) and a method for producing therefor will be explained, and an all-solid-state lithium secondary battery using the present ceramic material as a solid-state electrolyte material will be explained.

(Ceramic Material)

The present ceramic material is a complex oxide based ceramic material containing Li, La, Zr, Al and O. Resistance to lithium and Li ion conductivity can be provided by yielding a ceramic material which contains Al in addition to the constituents Li, La and Zr constituting the garnet-type crystal structure, and which moreover maintains a garnet-type or garnet-like crystal structure (hereafter referred to as LLZ crystal structure).

As one characteristic of the LLZ crystal structure that the present ceramic material has, the point of having an XRD pattern similar to the powder diffraction file 045-0109 ($Li_5La_3Nb_2O_{12}$) from the ICDD (International Centre for Diffraction Data), as one example of material having the same garnet-type crystal structure, may be cited. Note that, when comparing to 045-0109, since the constitutive elements are different and, in addition, there is the possibility that the Li concentration, or the like, in the ceramics is different, there are cases where diffraction angles and diffraction intensity ratios are different.

The present ceramic material contains Al in addition to Li, La and Zr as constitutive metal elements. It is known that by containing Al, a ceramic material having an LLZ crystal structure can be acquired as a handleable sintered body pellet for the first time, and moreover, Li ion conductivity is improved.

It is preferable that the present ceramic material has a ratio of the number of moles of Li with respect to La of 2.0 or greater to 2.5 or lower. Satisfactory density and Li conductivity can be obtained with this range. Further in addition, according to the present producing method, satisfactory density and Li ion conductivity can be obtained with a range of ratio of the number of moles of Li with respect to La of 2.0 or greater to 2.5 or lower. In particular, with a synthesis in an inert gas atmosphere such as Ar, the above ratio is 2.2 or greater to 2.5 or lower, with excellent Li ion conductivity (for instance, Li ion conductivity is $4.0 \times 10^{-5}$ S/cm or greater). More preferably, the above ratio is 2.2 or greater to 2.3 or lower, and the Li ion conductivity is $5.0 \times 10^{-5}$ S/cm or greater. In addition, with a synthesis under an atmosphere such as air, Li ion conductivity is excellent with the above ratio at 2.0 or greater to 2.2 or lower. More preferably, the above ratio is 2.0 or greater to 2.1 or lower, and the Li ion conductivity is $7.0 \times 10^{-5}$ S/cm or greater.

As long as the present ceramic material contains Li, La, Zr and Al as constitutive metal elements, further contains O and a single phase LLZ crystal structure can be confirmed, the form in which Al is present does not matter in particular. Al may be in the crystal lattice or may be outside the crystal lattice. Al is known to be present at least in a sintered body at the crystal grain boundary thereof. Al in the present ceramic material can be detected by, for instance, ICP (radio frequency inductively coupled plasma) emission spectrometric analysis, EPMA (electron probe micro analyzer), and the like, and in addition, the content thereof can be determined.

It is preferable that Al in the present ceramic material is contained in a range that improves sinterability (density of sintered body) and/or Li ion conductivity. In addition, it is preferable that Al is contained in the ceramic material of the present invention in a range that allows a LLZ crystal structure to be obtained. With regard to an Al content allowing such characteristic improvement or the like to be obtained, a person skilled in the art can determine readily the required amount of aluminum addition amount or content, for instance, by performing a firing step in the presence of a suitable amount of Al constituent with respect to Li constituent, La constituent, Zr constituent as well as Nb constituent and/or Ta constituent mixed at LLZ theoretical amount ratios and appropriate molar ratios based on the theoretical amount ratios, obtaining a sintered body, and measuring the characteristics and the crystal structure thereof. As an example, it is known that improved density and Li ion conductivity are obtained when 0.1 percent by mass or more aluminum is contained with respect to the total weight of the ultimately obtained LLZ-Al based ceramic powder or sintered body pellet. In addition, it is known that Li ion conductivity tends to decrease if 2 percent by mass is largely exceeded, such that 1.5 percent by mass or less is preferable.

As long as a LLZ crystal structure is obtained, each of the contents in Li, La and Zr in the present ceramic material is not limited in particular. It is known that each of the molar ratios of Li, La and Zr in the present ceramic material does not match necessarily Li:La:Zr=7:3:2, the molar ratios of each of the elements in $Li_7La_3Zr_2O_{12}$ described in Ramaswamy Murugan et al., and tends to deviate.

It is preferable that the density of the present ceramic material is 4.0 or greater. If the density is 4.0 or greater, handleability is satisfactory and satisfactory Li ion conductivity can be obtained. Preferably, it is 4.1 or greater, more preferably 4.2 or greater, all the more preferably 4.3 or greater, and even more preferably 4.4 or greater. Within a range that does not exceed the theoretical density, the upper limit of the density of the present ceramic material is not limited in particular.

The density of the present ceramic material is calculated, for instance, by measuring the weight and volume of the pellet. For instance, in the case of a cylindrical pellet, it is preferable to measure by a method by which the weight is measured, then the diameter is measured at several locations with a micrometer to yield a mean value, the thickness is also measured similarly at several locations with a micrometer to yield a mean value, the volume is calculated from these numerical values, and the density is measured from the respective values, or by a method by which accuracy and correctness equal to or higher than the above method are obtained.

The present ceramic material has Li ion conductivity. It is preferable that the Li ion conductivity of the present ceramic material is $2.0 \times 10^{-5}$ S/cm or greater, more preferably $3.0 \times 10^{-5}$ S/cm or greater, further preferably $4.0 \times 10^{-5}$ S/cm or greater, all the more preferably $6.0 \times 10^{-5}$ S/cm or greater, and even more preferably $8.0 \times 10^{-5}$ S/cm or greater. It is preferable to measure Li ion conductivity, for instance, by the alternating current impedance method or a method by which equivalent accuracy and correctness thereto are obtained.

The present ceramic material may be a powder or may be a sintered body (formed compact). As a solid-state electrolyte of a lithium secondary battery or the like, being a sintered body is preferable. As a ceramic material for obtaining a solid-state electrolyte in which another substance is included, being a powder is preferable.

Using the conductivity thereof, the present ceramic material can be used as various solid-state electrolyte materials. For instance, it can be used in a lithium secondary battery or various gas sensor materials such as for SOx, NOx, carbon dioxide and oxygen.

Note from what has been described above that a solid-state electrolyte containing the present ceramic material can be obtained according to the description herein. The solid-state electrolyte containing the present ceramic material can be used as a solid-state electrolyte for various applications. It is preferable in particular as a solid-state electrolyte of an all-solid-state lithium secondary battery. In addition, the solid-state electrolyte containing the present ceramic material can, for instance, by substituting for the separator portion or by superimposing on the separator of an ordinary lithium ion secondary battery that uses electrolyte solutions, separate the electrolyte solutions on the positive electrode side and the negative electrode side completely.

In addition, it is possible to substitute at least a portion of the separator with the present ceramic material, for instance, in a battery that uses sulfur in the positive electrode (for instance, LiS battery in combination with a negative electrode Li). It is known that with a LiS battery that uses electrolyte solutions, during battery operation, positive electrode polysulfide elutes into the electrolyte solution, and if this reaches the negative electrode side, it cause a battery capacity decrease. As a result, separation of e the electrolyte solutions of the positive and negative electrodes completely is a method for solving the cause of such a battery capacity decrease.

In addition, the solid-state electrolyte containing the present ceramic material can also be applied to air secondary batteries. That is to say, at least a portion of the liquid form electrolyte of an air secondary battery can be substituted with the solid-state electrolyte containing the present ceramic material. According to such a format, realization of a structure that can avoid or suppress the use of an organic electrolyte solution can be expected, allowing the battery structure to be simplified while at the same time secondary reactions caused by an organic electrolyte solution to be suppressed.

(Method for Producing Ceramic Material)

The method for producing the ceramic material described herein (hereafter simply referred to as the present producing method) can comprise the step of synthesizing a ceramic material which contains Li, La, Zr, Al and O and has a garnet-type or garnet-like crystal structure, and in which the ratio of the number of moles of Li with respect to La is 2.0 or greater to 2.5 or lower.

The synthesis step of present method for producing can prepare a raw material in which Li and La are included with the ratio of the number of moles of Li with respect to La at above 2.1 to 2.6 or lower. According to the present method for producing, a sintered body can be obtained with a handleable sinterability (density) and satisfactory Li ion conductivity.

(Preparation of Raw Material)

The raw material of the present ceramic material can contain Li, La, Zr and Al as well as O. These constitutive metal elements are contained in the raw material as a Li constituent, a La constituent, a Zr constituent and an Al constituent described below. In addition, while the present ceramic material contains O, O may be contained as a constitutive element within compounds of these constitutive metal elements.

(Li Constituent, La Constituent and Zr Constituent)

These various raw material constituents may be used by suitably selecting from various metal salts and the like, such as metal oxide, metal hydroxide and metal carbonate, containing the respective metal constituents, with no particular limitation. For instance, using $Li_2CO_3$ or LiOH as the Li constituent, using $La(OH)_3$ or $La_2O_3$ as the La constituent, and using $ZrO_2$ as the Zr constituent are possible.

It is preferable that Li and La are included with the ratio of the number of moles of Li with respect to La at above 2.1 to 2.6 or lower in the raw material. When the above ratio is 2.1 or lower, in the obtained ceramic material, the density is not sufficient and the Li ion conductivity also decreases; if the ratio exceeds 2.6, the density decreases and the ion conductivity decreases as well. If the above ratio is in the above-mentioned range, stable density and Li ion conductivity can be obtained. More preferably, the previous ratio is 2.2 or higher to 2.6 or lower. More preferably it is 2.2 or higher to 2.4 or lower, and even more preferably 2.2 or higher to 2.3 or lower.

In addition, it is preferable that Zr and La are included in the raw material such that the ratio of the number of moles of Zr with respect to La becomes 0.50 or greater to 0.83 or lower. If in this range, formation of a different phase due to excess La or Zr is suppressed, which may also suppress a decrease in conductivity. The inclusion is preferably carried out so as to have 0.67. This is because the formation of a different phase due to excess La or Zr is best suppressed if the ratio is 0.67.

(Al Constituent)

The Al constituent are not limited in particular, and various metal salts such as metal oxides, metal hydroxides, metal nitrates, metal organic compounds, individual metals, which contain Al can be suitably selected and used. For instance, $Al_2O_3$, $Al(NO_3)_3 \cdot 9H_2O$, $Al(OH)_3$, Al, aluminum acetylacetonate, aluminum triethoxide, aluminum butoxide, aluminum propoxide, aluminum methoxide, aluminum chloride, aluminum chloride hexahydrate, diethyl aluminum chloride, aluminum oleate, aluminum acetate n-hydrate, aluminum oxalate, aluminum bromide hexahydrate, aluminum stearate, triethyl aluminum, trimethyl aluminum, triisobutyl aluminum, aluminum sulfate, aluminum iodide and the like can be used. The Al constituent is made to be present with respect to the Li constituent, the La constituent and the Zr constituent in a range that allows improvement in sinterability and conductivity to be obtained by the inclusion of Al. In addition, it is blended preferably in a range that allows a LLZ crystal structure to be obtained in the ceramic material.

As has been described already, if a person skilled in the art, such an amount of Al constituent can be acquired by performing the synthesis step in the presence of various amounts of Al constituent with respect to the components of the ceramic material of the present invention to obtain a sintered body, and measuring conductivity or the like. Note that, in addition to cases where the molar ratios of the elements in the raw materials is obtained in the ceramic material obtained ultimately, in cases where losses during grinding and recovery of synthetic powder occur, they may not be maintained in the ultimately obtained ceramic material. Note that, the Al constituent as one constituent of firing raw materials and the supply format thereof will be described in detail subsequently.

These respective constituents can be used without particular limitation as long as they are industrially produced and available. Preferably, the purity is 95% or greater, and more preferably 98% or greater. In addition, moisture is preferably 1% or lower, and drying may be performed as necessary.

In addition, in preparing the raw material, raw material powder preparation methods that are well known in the synthesis of ceramic powders can be adopted suitably. For instance, loading into an automatic mortar and pestle or the like, adequate ball mill or the like, and homogeneously mixing is possible.

Note that the raw material is prepared according to the synthesis step described below. That is to say, either a raw material containing all the raw material constituents required for the present ceramic material may be prepared. Alternatively, it is also possible to prepare first a raw material containing a portion of the raw material constituents (for instance, a portion of the constituents among the Li constituent, La constituent, Zr constituent and Al constituent, or partial amounts) and add the remaining constituents or remaining amounts (for instance total amount of Al constituent or partial amount thereof, or the like) to the firing powder of this raw material (calcination powder), yielding the final raw material to synthesize the present ceramic material.

(Synthesis Step)

The synthesis step of the present methods is a step of synthesizing the present ceramic material in which the ratio of the number of moles of Li with respect to La is 2.0 or greater to 2.5 or lower by firing a raw material.

While the firing atmosphere in the synthesis step is not limited in particular, it may be an oxidizing atmosphere containing oxygen or an inert atmosphere comprising an inert gas such as Ar. In synthesizing the present ceramic material, obtaining high density becomes facilitated by heat treatment in an inert gas atmosphere. In addition, when a synthesis step which may be accompanied with sintering is performed in an inert gas atmosphere, obtaining the ratio of the number of moles of Li with respect to La in the synthetic powder is also facilitated. For instance, according to the performance of such a synthesis step, the molar ratio Li/La in the raw material is retained at 95% or greater and preferably 97% or greater, even after firing. When performing heat treatment in an inert gas atmosphere, it is preferable that the raw material is a powder containing an O constituent such as an oxide. For instance, between the first heat treatment step and the second heat treatment step described below, it is preferable that the second heat treatment step is carried out in an inert gas atmosphere. As inert gas species, for instance, one species or two species or more selected from helium (He), neon (Ne), argon (Ar), nitrogen (N), krypton (Kr), xenon (Xe) and radon (Rn) may be included. Preferable is Ar.

For instance, in order to obtain such present ceramic material in which the ratio becomes 2.2 or greater to 2.5 or lower, and more preferably 2.2 or greater to 2.3 or lower, it is preferable to use the already explained preferred raw material under an inert gas atmosphere such as Ar to carry out a synthesis step. So doing allows the present ceramic material to be obtained, in which the density and Li ion conductivity are satisfactory. Note that, it is preferable that the Li ion conductivity of the present ceramic material obtained in this way is $4.0 \times 10^{-5}$ S/cm or greater, and more preferably $5.0 \times 10^{-5}$ S/cm or greater. In addition, it is preferable to use to use the already explained preferred raw material under an atmosphere such as air and carry out a step of synthesizing the present ceramic material in which the ratio becomes 2.0 or greater to 2.2 or lower. So doing allows the present ceramic material to be obtained with satisfactory Li ion conductivity. More preferably, the ratio is 2.0 or greater to 2.1 or lower. It is preferable that the Li ion conductivity of the present ceramic material obtained in this way is $7.0 \times 10^{-5}$ S/cm or greater.

While the firing temperature for the synthesis is not limited in particular, 800° C. or higher is preferable, and more preferably, heat treatment at temperatures of 850° C. or higher to 1250° C. or lower is preferable.

In addition, the synthesis step may be one that combines two or more heat treatment steps. That is to say, the synthesis step can comprise a first heat treatment step of obtaining a primary firing powder containing at least Li, La, Zr and O, and a second heat treatment step of firing the primary firing powder in the presence of Al, to obtain the present ceramic material. Obtaining a LLZ crystal structure is facilitated by such a combination of heat treatment steps.

(First Heat Treatment Step)

The first heat treatment step is a step of performing thermal decomposition of at least a Li constituent, a La constituent and a Zr constituent to obtain a primary firing powder to facilitate the formation of a LLZ crystal structure in the second firing step. The primary firing powder may sometimes already have a LLZ crystal structure. The firing temperature is a temperature of preferably 850° C. or higher to 1150° C. or lower. The first heat treatment step may comprise a step of heating at a lower heating temperature and a step of heating at a higher heating temperature, within the temperature range mentioned above. Comprising such heating steps allows the ceramic powder to be obtained in a more homogeneous state, allowing a sintered body of a better quality to be obtained in the second heat treatment step. When performing a first heat treatment step with such plurality of steps, it is preferable to knead/grind after each heating step has ended, using an automatic mortar and pestle, a ball mill, a vibrating mill and the like. In addition, it is preferable that the grinding method be performed dry. So doing allows an all the more homogeneous LLZ phase to be obtained by the second heat treatment step.

The first heat treatment step may be performed in an oxidizing atmosphere such as air or may be performed in an inert atmosphere. The preferable atmosphere is also different depending on the raw materials. If thermal decomposition is taken into account, oxidizing atmosphere is preferable.

It is preferable for the heat treatment steps constituting the first heat treatment step to perform preferably a heat treatment step at 850° C. or higher to 950° C. or lower and a heat treatment step at 1075° C. or higher to 1150° C. or lower. Even more preferable are a heat treatment step at 875° C. or higher to 925° C. or lower (at approximately 900° C. is more preferable) and a heat treatment step at 1100° C. or higher to 1150° C. or lower (at approximately 1125° C. is more preferable).

It is preferable that the first heat treatment step is performed for approximately 10 hours or more to 15 hours or less overall as the total of heating time at the highest temperature set as the heating temperature. When the first heat treatment step is constituted by two heat treatment steps, it is preferable that the heating time at each highest temperature is approximately 5 to 6 hours.

Meanwhile, the first heat treatment step can be shortened by modifying the starting raw materials. For instance, when LiOH is used for the starting raw material, in order to obtain a LLZ crystal structure, the heating time of the LLZ components including Li, La, and Zr at the highest temperature can be shortened to 10 hours or less in the heat treatment step at 850° C. or higher to 950° C. or lower. This is because LiOH used in the starting raw materials forms a liquid phase at low temperatures thus reacting more readily with other starting raw materials at a lower temperature.

The raw material used in the first heat treatment step preferably contains a Li constituent, a La constituent and a Zr constituent and does not contain an Al constituent. In addition, it is preferable that Li and La are included with the ratio of the number of moles of Li with respect to La at above 2.1 to 2.6 or lower, and it is even more preferable that Zr and La are included with the molar ratio of Zr with respect to La at 0.67. When such a raw material is used, an Al constituent added and fired in the second heat treatment step.

Note that an Al constituent may be contained within the raw material used in the first heat treatment step. When an Al constituent is contained in the raw materials, a primary firing powder containing Al can be obtained. Therefore, an Al constituent is present inside the primary firing powder even without adding separately an Al constituent to the primary firing powder in the subsequent second firing step, and the primary firing powder becomes heat-treated in the presence of Al, even without adding separately an Al constituent in the second firing step. Note that a portion of the Al constituent may be contained within the raw material used in the first heat treatment step and the remaining Al constituent added to the primary firing powder in the second heat treatment step.

(Second Heat Treatment Step)

The second heat treatment step can be a step in which the primary firing powder obtained in the first heat treatment step is heated at a temperature of 950° C. or higher to 1250° C. or lower. According to the second heat treatment step, the primary firing powder obtained in the first heat treatment step is fired, ultimately allowing the present ceramic material having a LLZ crystal structure, which is a complex oxide, to be obtained.

In order to obtain a LLZ crystal structure, for instance, LLZ components including Li, La and Zr are heat-treated at a temperature of 1125° C. or higher to 1250° C. or lower. When $LiCO_3$ is to be used as an Li raw material, heat treatment at 1125° C. or higher to 1250° C. or lower is preferable. This is because if lower than 1125° C., a single phase of LLZ is difficult to obtain and Li ion conductivity is small, and if 1250° C. is exceeded, formation of a different phase ($La_2Zr_2O_7$ or the like) is observed, Li ion conductivity is small, and in addition, crystal growth becomes significant, such that maintaining the strength as a solid-state electrolyte tends to be difficult. From approximately 1180° C. or higher and 1230° C. or lower is more preferable.

Meanwhile, the second heat treatment step can be decreased in temperature by modifying the raw material constituents. For instance, when LiOH is to be used in the raw material constituents as a Li constituent, in order to obtain a LLZ crystal structure, the LLZ components including Li, La and Zr can be heat-treated even at temperatures of 950° C. or higher to lower than 1125° C. This is because LiOH used in the raw material constituents forms a liquid phase at low temperatures thus reacting more readily with other starting raw materials.

It is preferable that the heating time at the above heat temperature in the second heat treatment step is on the order of 18 hours or longer to 50 hours or shorter. This is because if the time is shorter than 18 hours, formation of LLZ based ceramics is not sufficiently, and if longer than 50 hours, in addition to the reaction with the setter becoming facilitated through the embedding powder, crystal growth is significant, such that strength as a sample cannot be maintained. Preferable is 30 hours or longer.

While the second heat treatment step can be performed in air atmosphere, when the density of sintered body, maintenance the molar ratio Li/La and the like are considered, performing in an inert gas atmosphere is preferable.

It is preferable to perform the second heat treatment step using a formed compact containing the primary firing powder. For instance, a preferable performance is once the primary firing powder or a powder from the addition of an Al constituent or the like to the primary firing powder has been pressure-formed using a well known press method into a formed compact that has been conferred a desired three-dimensional shape (for instance, shape and size usable as a solid-state electrolyte or a separator of a secondary battery). Turning into a formed compact not only accelerates the solid phase reaction, but allows a sintered body to be obtained readily. Note that after the second heat treatment step, the ceramic powder obtained in the second heat treatment step may be turned into a formed compact and a sintering step may be performed separately at similar temperatures to the heating temperature in second heat treatment step.

When firing and sintering the formed compact containing the primary firing powder in the second heat treatment step, a preferable performance is by embedding the formed compact in the same powder. Doing so suppresses the loss of Li, and can an alteration of the composition before and after the second heat treatment step. In addition, In addition, by holding the formed compact from above and underneath the embedding powder with setters as necessary, warping of the sintered body at firing time can be prevented.

Meanwhile, when the temperature is decreased by using LiOH as the Li raw material or the like in the second heat treatment step, the formed compact of the primary firing powder can be sintered even without being embedded in the same powder. This is because the loss of Li is suppressed relatively due to the second heat treatment step being decreased in temperature.

In order to perform the second heat treatment step in the presence of Al, as has been explained already, there is one mode which the first heat treatment step can be performed by using a raw material containing an Al constituent (containing a Li constituent, a La constituent, a Zr constituent and an Al constituent) and the second heat treatment can be performed by using the obtained primary firing powder as-is. In addition, another mode is the mode which the first heat treatment step can be performed using a raw material not containing an Al constituent (containing a Li constituent, a La constituent and a Zr constituent) and the second heat treatment step can be performed after adding and mixing the Al constituent with the obtained primary firing powder. To perform the second firing step in the presence of Al, either of these modes may be adequate, or these modes may be combined suitably.

According to the above firing step, the present ceramic material powder or a sintered body thereof can be obtained. In addition, the ceramic material of the present invention can be obtained with certainty by performing the first heat treatment step and the second heat treatment step.

(All-Solid-State Lithium Secondary Battery)

The all-solid-state lithium secondary battery of the description herein (hereinafter referred to as the present secondary battery) can be provided with a positive electrode, a negative electrode and a solid-state electrolyte containing a ceramic material containing Li, La, Zr, Al and O, having a garnet-type or garnet-like crystal structure and obtained by firing a raw material in which Li and La are included with the ratio of the number of moles of Li with respect to La at above 2.1 to 2.6 or lower. According to the description herein, an all-solid-state lithium secondary battery equipped with a solid-state electrolyte provided with excellent resistance to lithium, satisfactory density and Li ion conductivity can be provided.

In the present secondary battery, it is preferable to use as a solid-state electrolyte the sintered body obtained by the present producing method as-is, or suitably processed without grinding. Note that a formed compact containing other constituents may be obtained using a powder fired in powder state in the second heat treatment step, and this formed compact may serve as the solid-state electrolyte. The producing method for the formed compact may apply producing methods for ceramic formed compact that are well known in prior art. For instance, forming methods such as press method, doctor blade method, roll coater method, and the like, may be given.

The positive electrode and the negative electrode of the present secondary battery can contain a positive electrode active substance and a negative electrode active substance that are well known in prior art and used in lithium secondary batteries, and are prepared by conventional methods.

(Positive Electrode Active Substance)

There is no particular limitation as positive electrode active substance, and positive electrode active substances used in all-solid-state batteries that are well known in prior art can be used. In particular, when a metal oxide is used as a positive electrode active substance, sintering of the secondary battery can be carried out under oxygen atmosphere. As concrete examples of such positive electrode active substances, manganese dioxide ($MnO_2$), iron oxide, copper oxide, nickel oxide, lithium manganese complex oxides (for instance, $Li_xMn_2O_4$ or $Li_xMnO_2$), lithium nickel complex oxides (for instance, $Li_xNiO_2$), lithium cobalt complex oxides (for instance, $Li_xCoO_2$), lithium nickel cobalt complex oxides (for instance, $LiNi_{1-y}CO_yO_2$), lithium manganese cobalt complex oxides (for instance, $LiMn_yCO_{1-y}O_2$), spinel-type lithium manganese nickel complex oxides (for instance, $Li_xMn_{2-y}Ni_yO_4$), lithium phosphate compounds having an olivine structure (for instance, $Li_xFePO_4$, $Li_xFe_{1-y}Mn_yPO_4$, $Li_xCoPO_4$), lithium phosphate compounds having a nasicon structure (for instance, $Li_xV_2(PO_4)_3$), iron sulfate ($Fe_2(SO_4)_3$), vanadium oxides (for instance, $V_2O_5$), and the like, can be cited. These may be used alone, or may be used by combining two or more species. Note that in these chemical formulae, it is preferable that x and y are in the ranges $1<x<5$ and $0<y<1$. Among these, $LiCoO_2$, $Li_xV_2(PO_4)_3$, $LiNiPO_4$, $LiFePO_4$ and $Li_xNiO_2$ are preferable. In addition, examples of the positive electrode active substance include S (sulfur), $Li_2S$ (sulfide), and $Li_2S_n$ (lithium polysulfide).

(Negative Electrode Active Substance)

There is no particular limitation as negative electrode active substance, and negative electrode active substances used in all-solid-state batteries that are well known in prior art can be used. For instance, carbon, metal lithium (Li), lithium alloys such as gold-lithium alloys and indium lithium, metal compounds, metal oxides, Li metal compounds, Li metal oxides (including lithium-transition metal complex oxides), boron-added carbon, graphite, compounds having a nasicon structure, and the like, can be cited. These may be used alone, or may be used by combining two or more species. For instance, when the above metal lithium (Li) is used, the capacity of the all-solid-state battery can be expanded. As the above-mentioned carbon, carbon materials that are well known in prior art can be cited, such as, for instance, graphite carbon, hard carbon and soft carbon. As the above-mentioned metal compounds, LiAl, LiZn, $Li_3Bi$, $Li_3Cd$, $Li_3Sd$, $Li_4Si$, $Li_{4.4}Pb$, $Li_{4.4}Sn$, $Li_{0.17}C$ ($LiC_6$), and the like, can be cited. As the above-mentioned metal oxides, SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, $TiO_2$, FeO, and the like, can be cited. As Li metal compounds, $Li_3FeN_2$, $Li_{2.6}Co_{0.4}N$, $Li_{2.6}Cu_{0.4}N$, and the like, can be cited. As Li metal oxides (lithium-transition metal complex oxides), the lithium-titanium complex oxide represented by $Li_4Ti_5O_{12}$, and the like, can be cited. As the above-mentioned boron-added carbon, boron-added carbon, boron-added graphite, and the like, can be cited. Metal lithium is preferred.

Note that in order to obtain a positive electrode and a negative electrode, in addition to each active substance described above, a positive electrode material or a negative electrode material containing suitably an electronic conduction aid or a binder may be prepared beforehand. As electronic conduction aids, for instance, acetylene black, carbon black, graphite, various carbon fibers, carbon nanotube, and the like, may be given. As binders, for instance, polyvinylidene fluoride (PVDF), SBR, polyimide, polytetrafluoroethylene, and the like, may be given. In addition, such various active substances can be used alone or by combining two or more species, in a positive electrode.

The positive electrode and the negative electrode that the present secondary battery is provided with may have any morphology as long as it functions as a secondary battery. It is possible to turn the positive electrode active substance or positive electrode material or the negative electrode active substance or negative electrode material described above into a formed compact using a well known forming method such as press method, doctor blade method or roll coater method. With the press method, a formed compact can be obtained by filling a mold or the like with a positive electrode active substance powder or a negative electrode active substance powder and applying pressure. Meanwhile, with the doctor blade method and the roll coater method, a mixture is obtained first by mixing a positive electrode active substance or a negative electrode active substance and a binder such as polyvinyl alcohol. Note that, a suitable amount of solid-state electrolyte may be added to the mixture, as necessary. Next, an organic solvent such as toluene is added to the obtained mixture to prepare a positive electrode slurry. The prepared positive electrode slurry is formed into a film shape or a sheet shape of a given thickness by a forming method such as doctor blade method or roll coater method. After drying, as necessary by performing processing such as cutting, and by firing, a positive electrode and a negative electrode can be prepared. In addition, a formed compact suitably containing the above various active substances and a powder of the ceramic material of the present invention may serve as the positive electrode and the negative electrode.

A cell of the present secondary battery is fabricated by combining the positive electrode material or positive electrode, the negative electrode material or negative electrode prepared as above with a solid-state electrolyte. While fabrication of the cell is also different depending on the morphology of the battery to be obtained ultimately, for instance, it is possible to provide a positive electrode material on one side of the solid-state electrolyte to serve as the positive electrode, and provide a negative electrode material on the other side of the solid-state electrolyte to serve as the negative electrode, or the like. Note that the cell structure of the present secondary battery is not limited in particular. For instance, it may have various battery morphologies such as, in addition to coin-type, cylinder-type and box-type.

Note that, from what has been explained above, the present invention can also be carried out as a producing method for an all-solid-state lithium secondary battery comprising the step of obtaining the sintered body of the present ceramic material by firing the above-mentioned raw material, and the step of fabricating a cell of a secondary battery by combining with a positive electrode and a negative electrode the sintered body serving as a solid-state electrolyte.

Example

Hereafter, the present invention will be described by giving examples. The following examples are for the purpose of explaining the present invention, and are not to limit the present invention.

(Preparation of Raw Material)

Lithium hydroxide, lanthanum hydroxide (Shin-Etsu Chemical Co., Ltd.) and zirconium oxide (Tosoh Corporation) were used, each as a raw material constituent for the preparation of a raw material. Powders thereof were weighed and mixed so as to have each molar ratio below, and mixed in an automatic mortar and pestle to give raw material 1 to 5

| Type of raw material | $LiOH:La(OH)_3:ZrO_2$ |
|---|---|
| 1 | 7.7:3:2 |
| 2 | 7:3:2 |
| 3 | 6.8:3:2 |
| 4 | 6.6:3:2 |
| 5 | 6.3:3:2 |

(First Heat Treatment Step)

The prepared raw material was introduced in an alumina crucible heated up in air atmosphere at 600° C./hours and maintained at 900° C. for 6 hours.

(Second Heat Treatment Step)

In addition, after the first heat treatment step, $\gamma$-$Al_2O_3$ was added at a concentration of 1.5 percent by mass to each powder, this powder was mixed with stone balls and ground using a vibrating mill for 3 hours grinding. After grinding, the present powders were passed through a sieve, and these powders were press-formed using a mold at approximately 100 MPa, then, this pellet was placed on an alumina setter, introduced along with the setter into an alumina sheath and respectively heated up in air atmosphere and Ar atmosphere at 200° C./hours and maintained at 1000° C. for 36 hours to obtain pellets. Note that, as the Ar atmosphere, an oven interior of approximately 3 L capacity was vacuumed beforehand, and then 99.999% pure Ar gas was flown in an electric oven at 2 L/min.

For each pellet, once the top and bottom surfaces were polished, structure evaluation, chemical analysis, and electrochemical measurements were carried out as described below.

EXAMPLES

Structure Evaluation

X-ray diffraction measurement of the pellets was performed. In addition, after the weight of the pellet was measured, the diameter of the pellet was measured at several locations using a micrometer to calculate the mean value, then, the thickness of the pellet was measured similarly to calculate the volume of the pellet, and the density was calculated. The results are shown in Table 1 and FIG. 1.

TABLE 1

| Raw material | $LiOH:La(OH)_3:ZrO_2$ | Molar ratio in loading amount Li/La | Zr/La | Firing atmosphere | Density g/cm$^3$ | Li wt % | La wt % | Li/La (mol/mol) | Li conductivity S/cm |
|---|---|---|---|---|---|---|---|---|---|
| 1 | 7.7:3:2 | 2.57 | 0.67 | Air | 4.48 | 5.22 | 48.31 | 2.16 | $7.5 \times 10^{-5}$ |
|   |   |   |   | Ar | 4.47 | 5.99 | 47.97 | 2.50 | $4.7 \times 10^{-5}$ |

TABLE 1-continued

| Raw material | Molar ratio in LiOH:La(OH)$_3$:ZrO$_2$ | loading amount Li/La | Zr/La | Firing atmosphere | Density g/cm$^3$ | Chemical analysis Li wt % | La wt % | Li/La (mol/mol) | Li conductivity S/cm |
|---|---|---|---|---|---|---|---|---|---|
| 2 | 7:3:2 | 2.33 | 0.67 | Air | 4.54 | 5.30 | 50.54 | 2.10 | $7.3 \times 10^{-5}$ |
|   |       |      |      | Ar  | 4.71 | 5.51 | 50.37 | 2.19 | $6.3 \times 10^{-5}$ |
| 3 | 6.8:3:2 | 2.27 | 0.67 | Air | 4.48 | 4.90 | 48.13 | 2.04 | $1.0 \times 10^{-4}$ |
|   |         |      |      | Ar  | 4.71 | 5.48 | 48.34 | 2.27 | $9.8 \times 10^{-5}$ |
| 4 | 6.6:3:2 | 2.2  | 0.67 | Air | 4.21 | 4.72 | 47.08 | 2.01 | $2.6 \times 10^{-5}$ |
|   |         |      |      | Ar  | 4.55 | 5.30 | 47.86 | 2.22 | $5.3 \times 10^{-5}$ |
| 5 | 6.3:3:2 | 2.1  | 0.67 | Ar  | 2.65 | 4.89 | 45.81 | 2.14 | $4.0 \times 10^{-7}$ |

(Chemical Analysis)

Chemical analysis was performed in order to have an idea of the Li and La content of the pellet. The analysis performed an inductively coupled plasma emission analysis (ICP analysis). The results are shown in Table 1.

(Li Ion Conductivity Measurement)

Figure 2:
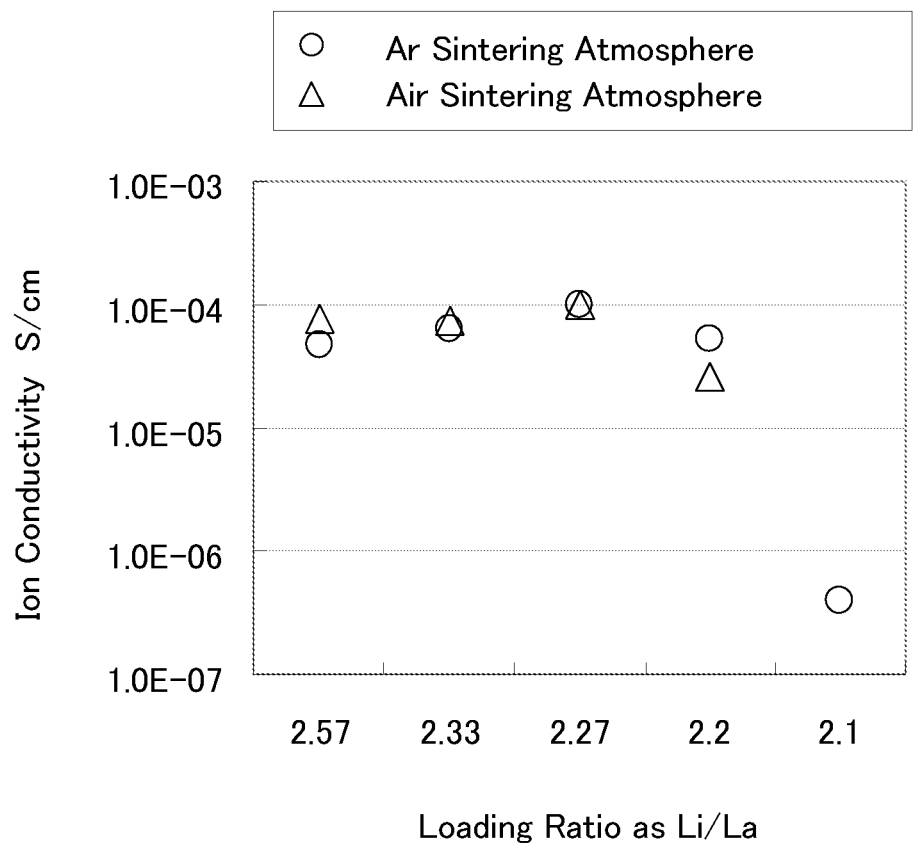
FIG. 2 shows the relationship between the Li loading amount and Li conductivity in an Li—La—Zr—Al based ceramics.

Au sputtering was performed on each pellet, which was further vacuum-dried at 110° C. or higher for 5 hours or longer, introduced as-is into an Ar atmosphere glove box, and integrated into a CR2032 coin cell. The present coin cell was taken out into air and alternating current impedance measurement was carried out at 1 MHz to 0.1 Hz frequency and 10 mV voltage using an electrochemical measurements system (potentio-galvanostat frequency response analyzer) manufactured by Solartron. The results are shown in Table 1 and FIG. 2.

Figure 3:
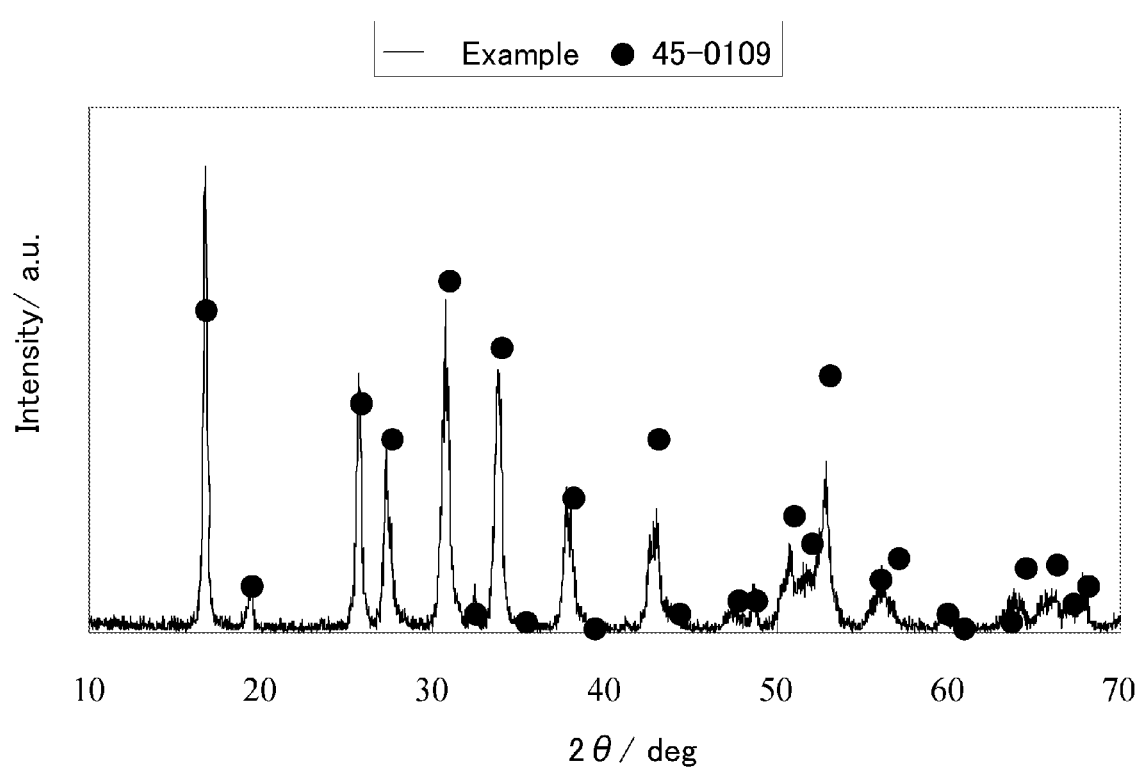
FIG. 3 shows one example of X-ray diffraction spectrum of an Li—La—Zr—Al based ceramics.

In regard to the crystal structure, both air and Ar atmosphere firing of the raw material 1 to 5 obtained crystal structures similar to the ICDD powder diffraction file 045-0109. It was revealed from this that all the obtained pellets had the characteristics of an LLZ crystal structure. As a representative example, the X-ray diffraction spectrum of the Ar fired pellet of the raw material 2 is shown in FIG. 3.

From the above results, according to the present producing method, it was revealed that a ceramic material in which the density is 4.0 or greater could be obtained. In addition, it was revealed that a ceramic material in which the density is higher, that is to say, 4.1 or higher and furthermore 4.2 or higher, could be obtained. In addition, it was also revealed that a ceramic material in which the density is 4.3 or higher and 4.4 or higher could be obtained.

In addition, according to the present producing method, it was revealed that a ceramic material in which the Li ion conductivity is $2.0 \times 10^{-5}$ S/cm or greater could be obtained. In addition, it was revealed that a ceramic material in which the Li ion conductivity is higher, that is to say, $3.0 \times 10^{-5}$ S/cm or higher, furthermore, $4.0 \times 10^{-5}$ S/cm or higher, further in addition, $6.0 \times 10^{-5}$ S/cm or higher, and furthermore, $8.0 \times 10^{-5}$ S/cm or higher, could be obtained.

In addition, according to the method for producing a ceramic material described herein, inclusion of Li and La in the raw material so that the ratio of the number of moles of Li with respect to La is above 2.1 to 2.6 or lower was effective for satisfactory density and Li ion conductivity. In addition, it was revealed that this ratio is preferably 2.2 or greater to 2.6 or lower, more preferably 2.2 or greater to 2.4 or lower, and all the more preferably 2.2 or greater to 2.3 or lower.

From the above, a ceramic material in which the ratio Li/La (mol/mol) is 2.0 or greater to 2.5 or lower and having excellent Li ion conductivity (for instance, Li ion conductivity is $4.0 \times 10^{-5}$ S/cm or greater) can be obtained. In an inert atmosphere firing such as Ar, a ceramic material in which the ratio Li/La (mol/mol) is 2.2 or greater to 2.5 or lower and having excellent Li ion conductivity (for instance, Li ion conductivity is $4.0 \times 10^{-5}$ S/cm or greater) can be obtained. More preferably, the ratio is 2.2 or greater to 2.3 or lower and Li ion conductivity is $5.0 \times 10^{-5}$ S/cm or greater. In addition, with air atmosphere firing, a ceramic material in which the ratio is 2.0 or greater to 2.2 or lower and having excellent Li ion conductivity (for instance, Li ion conductivity is $5.0 \times 10^{-5}$ S/cm or greater) can be obtained. More preferably the ratio is 2.0 or greater to 2.1 or lower and Li ion conductivity is $7.0 \times 10^{-5}$ S/cm or greater.

In addition, it was revealed that the molar ratio Li/La in the raw material used in the first heat treatment step could be maintained approximately 98% by performing the second heat treatment step under an inert gas atmosphere. This indicates that satisfactory sinterability and density are obtained by a heat treatment step under inert gas atmosphere. Meanwhile, it was revealed that the above molar ratio Li/La could be maintained only on the order of 89% by performing the second heat treatment step under an oxidizing gas atmosphere.

Representative, non-limiting examples of the present invention have been described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved ceramic material and use thereof.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A sintered compact of a ceramic material having a formula of $Li_aLa_bZr_xO_c$—Al, wherein a:b:x is approximately 7:3:2 and c is approximately 12, the sintered compact having a garnet-type or garnet-like crystal structure, and a density of not less than 4.0 g/cm$^3$, wherein a ratio of a number of moles of Li with respect to La is 2.0 or greater to 2.3 or lower, and wherein the ceramic material contains Al in an amount of 0.1 mass % or more to 2 mass % or less with respect to a total mass of the ceramic material.

2. The sintered compact according to claim 1, obtained by firing a raw material of the ceramic material having a molar ratio of Li to La that is above 2.1 to 2.3 or lower.

3. The sintered compact according to claim 1, wherein the ratio of the number of moles of Li with respect to La is 2.0 or greater to 2.1 or lower.

4. The sintered compact according to claim 1, which is a solid-state electrolyte material.

5. A secondary battery which is an all-solid-state lithium secondary battery, comprising:
   a positive electrode;
   a negative electrode; and
   a solid-state electrolyte comprising a sintered compact of a ceramic material having a formula of $Li_aLa_bZr_xO_c$—Al, wherein a:b:x is approximately 7:3:2 and c is approximately 12, and having a garnet-type or garnet-like crystal structure, and a density of not less than 4.0 g/cm$^3$, wherein a ratio of a number of moles of Li with respect to La is 2.0 or greater to 2.3 or lower, and wherein the ceramic material contains Al in an amount of 0.1 mass % or more to 2 mass % or less with respect to a total mass of the ceramic material.

6. An all-solid-state secondary battery using a sintered compact of the ceramic material according to claim 1.

7. An air secondary battery using a sintered compact of the ceramic material according to claim 1.

8. A lithium ion secondary battery using a sintered compact of the ceramic material according to claim 1.

9. A method for producing a ceramic material, the method comprising steps of:
   synthesizing the ceramic material having a formula of $Li_aLa_bZr_xO_c$—Al,
   wherein a:b:x is approximately 7:3:2 and c is approximately 12, and having a garnet-type or garnet-like crystal structure, and a density of not less than 4.0 g/cm$^3$,
   wherein a ratio of a number of moles of Li with respect to La is 2.0 or greater to 2.3 or lower, and
   wherein the ceramic material contains Al in an amount of 0.1 mass % or more to 2 mass % or less with respect to a total mass of the ceramic material,
   wherein the synthesis step comprises a first heat treatment step of acquiring a primary firing powder containing at least Li, La, Zr and O, and a second heat treatment step of obtaining the ceramic material by firing the primary firing powder in a presence of Al.

10. The method according to claim 9, wherein the synthesis step comprises a step of preparing and firing a raw material in which Li and La are included with the ratio of the number of moles of Li with respect to La at above 2.1 to 2.3 or lower.

11. The method according to claim 10, wherein La and Zr are included in the raw material with a ratio of a number of moles of Zr with respect to La at 0.67.

12. The method according to claim 9, wherein the first heat treatment step is a step of acquiring the primary firing powder comprising Li, La, Zr and O, and the second heat treatment step is a step of firing an Al constituent and the primary firing powder.

13. The method according to claim 9, wherein the second heat treatment step is a step of firing and sintering a formed compact containing the primary firing powder.

14. The method according to claim 9, wherein synthesis of the ceramic material is carried out in an inert gas atmosphere.

* * * * *